March 20, 1956 — S. BIZJAK — 2,738,845
MOTOR PROPELLED SLED
Filed Nov. 8, 1954
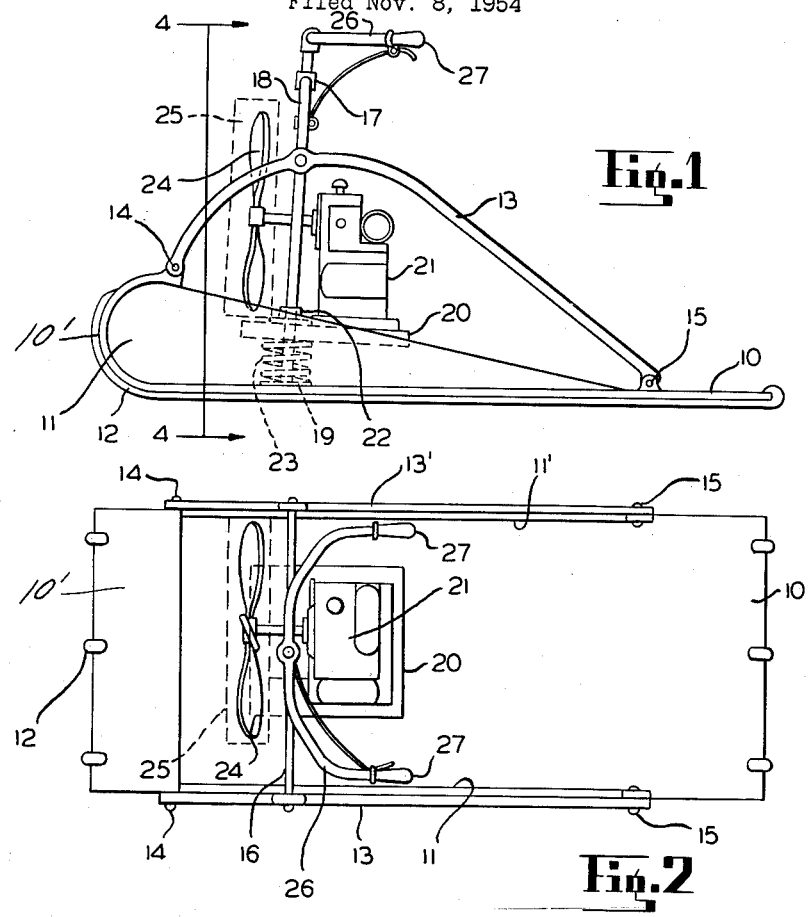
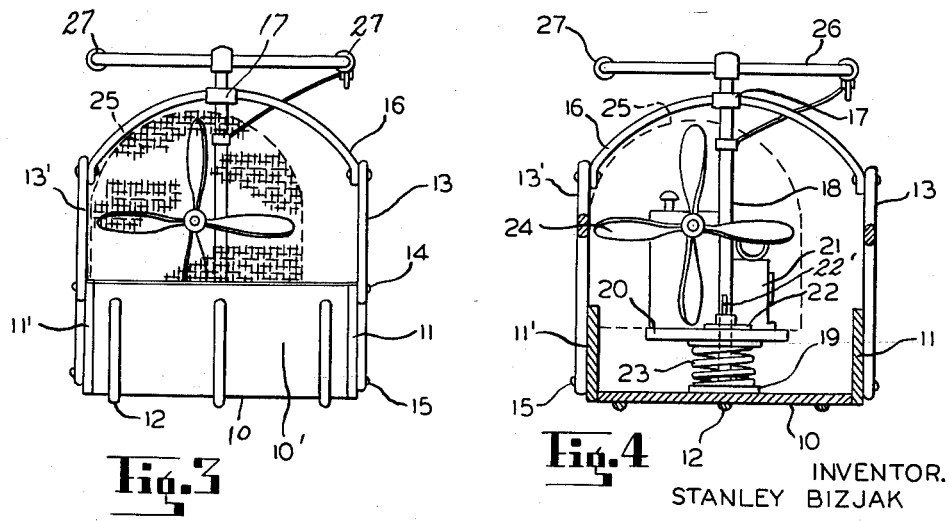
INVENTOR.
STANLEY BIZJAK
BY PARKER & CARTER
ATTORNEYS

United States Patent Office 2,738,845
Patented Mar. 20, 1956

2,738,845

MOTOR PROPELLED SLED

Stanley Bizjak, Marinette, Wis.

Application November 8, 1954, Serial No. 467,598

3 Claims. (Cl. 180—3)

My invention relates to vehicles and more particularly to a propeller driven snow vehicle.

The object of my invention is to provide a propeller driven sled that is steered by means of a pivotally mounted propeller.

Another object of my invention is to provide a device that has a propeller driven directly by the power means.

Still another object of my invention is to provide a device having a flat contact surface to enable it to be conveyed over snow or ice.

A further object of my invention is to provide a device that is constructed in a manner to prevent tipping, due to the flat contact with the surface of the snow or ice and supported by the weight of the operator.

The winter sport of ice boating, skiing or tobogganing, is meeting with more favor in recent years. It is the purpose of my invention to provide a self-propelled sled, or vehicle for use uphill or downhill or on flat surfaces that may be propelled over snow or ice, and is actuated by a propeller forcing the vehicle forward by means of the air current.

The device is simple and inexpensive and provides a spreading thrill to the operator, which is its prime purpose.

Other and further objects of my invention will become more apparent as the description proceeds when taken in conjunction with the drawings, in which:

Figure 1 is a side view of the assembled device.

Figure 2 is a top or plan view of the assembled device.

Figure 3 is a front view of the device as shown in Figures 1 and 2, and

Figure 4 is a fragmentary cross sectional view of the device taken at the line 4—4 in Figure 1.

Similar characters of reference indicate corresponding parts throughout the several views and referring now to the same, the device comprises a body which is constructed of plywood or the like and consists of a flat board 10 having upright side plates 11 and 11' disposed along its outer edges.

The base board 10 is turned upwardly to form a nose 10' at its forward end to permit contact with the snow or the like, and if desired, metal runners shown as 12 may be fastened to the bottom of the flat base board for guiding it along icy surfaces.

Side guard rails 13 and 13' are arched upwardly above the side boards 11, 11' in the form shown, being attached to the base board 10 at 14 at the forward end on the top of the upwardly extending nose and at 15 near the rearward end of the base. A cross member 16 is arched from one guard rail to the other near the front of the vehicle, at or adjacent the top of the arm. The cross member 16 has a center bearing member shown as 17 through which a vertically disposed steering column 18 passes. This steering column 18 is also rotatably supported at its bottom in a bearing plate 19 fixed on the base 10.

A platform shown as 20 surrounds the steering column 18. This steering column 18 passes through an aperture within the platform 20. The platform 20 acts as a mounting for an internal combustion engine shown as 21 which forms the actuating means for the device. The platform 20 has a guide bearing shown as 22 which is feathered at 22' on the steering column 18, to permit vertical slidable but non-rotational movement of the platform 20 relative to the steering column 18. The platform 20 is yieldably supported at its bottom by means of a resilient spring member 23 which rests on the bearing plate 19 of plate 10.

The internal combustion engine 21 forming an actuating means for the device is equipped with an air propeller shown as 24 rotatable in a vertical plane in front of the cross bar 16. The propeller is preferably enclosed within a wire mesh screen shown as 25 for the protection of the operator of the device.

The top of the steering column 18 has a handle bar 26 which has two laterally extending portions equipped with handles or grips shown as 27. A conventional control for the acceleration of the internal combustion engine may be mounted on this handle bar as shown, for the convenience of the operator.

It will be manifest from the above description that the operator stands on the platform 10 and supports himself by means of the handle bars 26, which handle bars permit the pivoted motion of the steering column 18. Inasmuch as the platform 20 supporting the internal combustion engine 21 revolves when the steering column is moved by means of the handle bars 26, it will cause the propeller 24 actuated by means of the internal combustion engine 21 to move with the engine 21 and thus change its horizontal angle with relation to the body of the vehicle causing the vehicle to go in either direction as it is being steered by means of the handle bars 26 on the top of the steering column 18. It is the force of the air that is actuated by the propeller 24 which moves the vehicle forward, and the control of the accelerator feeding the fuel to the internal combustion engine would determine the speed of the propeller and thus determine the speed of the vehicle. The horizontal angle of the propeller axis in its relation to the base of the vehicle would determine the direction in which the vehicle will be guided.

Although I have shown a particular arrangement of the specific structure of the device, I am fully cognizant of the fact that many changes in the form and configuration of the component parts constituting the device may be made without affecting their operativeness, the spirit of my invention or the scope of the appended claims.

Having thus described my invention, what I claim and desire to secure by Letters Patent in the United States is:

1. A propeller driven snow vehicle comprising a flat horizontal base having runners along its bottom, said base being curved upwardly at its forward end, upright side boards along the side edges of said base, guard rails attached to and adjacent the front and rear of said side boards, a steering column vertically journalled in a bearing supported by said base, a cross member extending from one guard rail to the other, said cross member having a bearing for rotatably supporting the upper end of said vertical steering column, a platform supported on said steering column and rotatable therewith and slidable therealong, means supporting said platform on said base for vertical yieldable and slidable movement along said steering column, an internal combustion engine mounted on said platform for rotational movement with said steering column, said internal combustion engine having an air propeller rotatable in an upright plane transversely above the base of said vehicle, and a handle bar at the top of said steering column providing means for rotating said steering column, to change the plane of rotation of the propeller in its relation to the base plate, for steering the vehicle.

2. A vehicle comprising in combination a flat horizontal base plate having an upturned nose at its forward end, guard rails fastened along the side edges of said base plate, said guard rails extending in arched relation to said base plate, a cross bar connecting said rails, a vertical steering column, means rotatably supporting said column at its lower end on said base plate and near its upper end on said cross bar, a platform surrounding said steering column and slidably mounted thereon and rotatable therewith, a resilient supporting member disposed between said platform and said base plate, an internal combustion engine forming the actuating means for said vehicle wholly mounted on said platform, said engine having an air propeller rotatable in a vertical plane in front of said steering column, a handle bar attached to the top of said steering column for revolving said steering column and said platform to change the plane of said propeller in its relation to said base plate for steering said vehicle.

3. A snow vehicle of the character described provided with a flat horizontal base plate turned upward at its forward end, side members engaging both edges of said base plate and extending rearwardly from said forward end, a base bearing disposed on the upper surface of said base plate, a pair of guard rails attached to the sides of said base plate, a cross member extending from one guard rail to the other at the upper portions of the latter, said cross member having a bearing in alignment with the base bearing mounted on the surface of said base plate, a steering column extending vertically from said bottom base bearing through the bearing in said cross member said steering column provided with a handle bar at its upper end for moving said steering column, a platform feathered on said steering column for sliding but non-rotating movement, resilient support means between said platform and the upper face of said base plate, an internal combustion engine wholly supported on said platform, said internal combustion engine having an air propeller rotatable in a vertical plane in front of the steering column, said motor and propeller being swingable horizontally with said steering column for steering the vehicle.

References Cited in the file of this patent
UNITED STATES PATENTS

| | | |
|---|---|---|
| 1,363,071 | Williams | Dec. 21, 1920 |
| 1,492,378 | Krysak | Apr. 29, 1924 |
| 2,582,858 | Capiak | Jan. 15, 1952 |
| 2,606,623 | Vickers | Aug. 12, 1952 |